United States Patent [19]

Morello

[11] 4,246,926
[45] Jan. 27, 1981

[54] APPARATUS FOR REMOVING RESIDUAL WATER FROM A WATER SYSTEM

[76] Inventor: Salvatore T. Morello, 1661 86th St., Brooklyn, N.Y. 11214

[21] Appl. No.: 33,311

[22] Filed: Apr. 25, 1979

Related U.S. Application Data

[63] Continuation-in-part of Ser. No. 886,244, Mar. 13, 1978, abandoned.

[51] Int. Cl.³ .............................................. F16K 51/00
[52] U.S. Cl. ................................. 137/209; 137/234.5; 137/240; 137/606
[58] Field of Search ............... 137/209, 318, 324, 606, 137/223, 234.5, 240, 605; 251/145

[56] References Cited
U.S. PATENT DOCUMENTS

| | | | |
|---|---|---|---|
| 154,181 | 8/1874 | Kreiss | 137/324 |
| 3,815,624 | 6/1974 | Mullins | 137/318 |
| 3,845,779 | 11/1974 | Greene | 137/606 X |
| 3,997,140 | 12/1976 | Mullins | 251/145 |

*Primary Examiner*—Alan Cohan

*Attorney, Agent, or Firm*—Hane, Roberts, Spiecens & Cohen

[57] ABSTRACT

Apparatus for removing residual water from a water system including a water supply pipe and a shut-off valve. The apparatus comprises a valve detachably mounted in the water supply pipe and including an air valve element controlling flow of supplied compressed air to the water supply pipe to blow out residual water from the pipe after the shut-off valve has been closed. The valve comprises a hollow body having an axis of symmetry with threads on the body for threadably engaging the pipe at a position therealong such that the body extends radially of the pipe and communication is established between the interior of the body and the interior of the pipe. A tool-engaging portion is formed on the body to allow the body to be threadably engaged and disengaged with the pipe by a tool. The air valve element is coaxially secured in the hollow body to control flow of compressed air to the pipe. The air valve element extends axially from the body and includes an actuating element to permit introduction of compressed air to the pipe via the hollow body. The air valve element is sealably secured in the hollow body.

6 Claims, 3 Drawing Figures

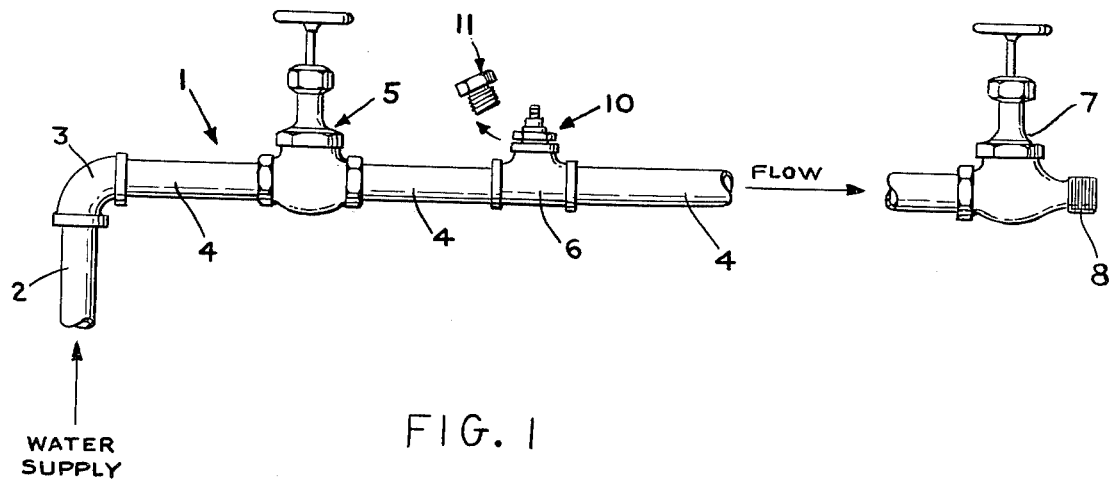
FIG. 1
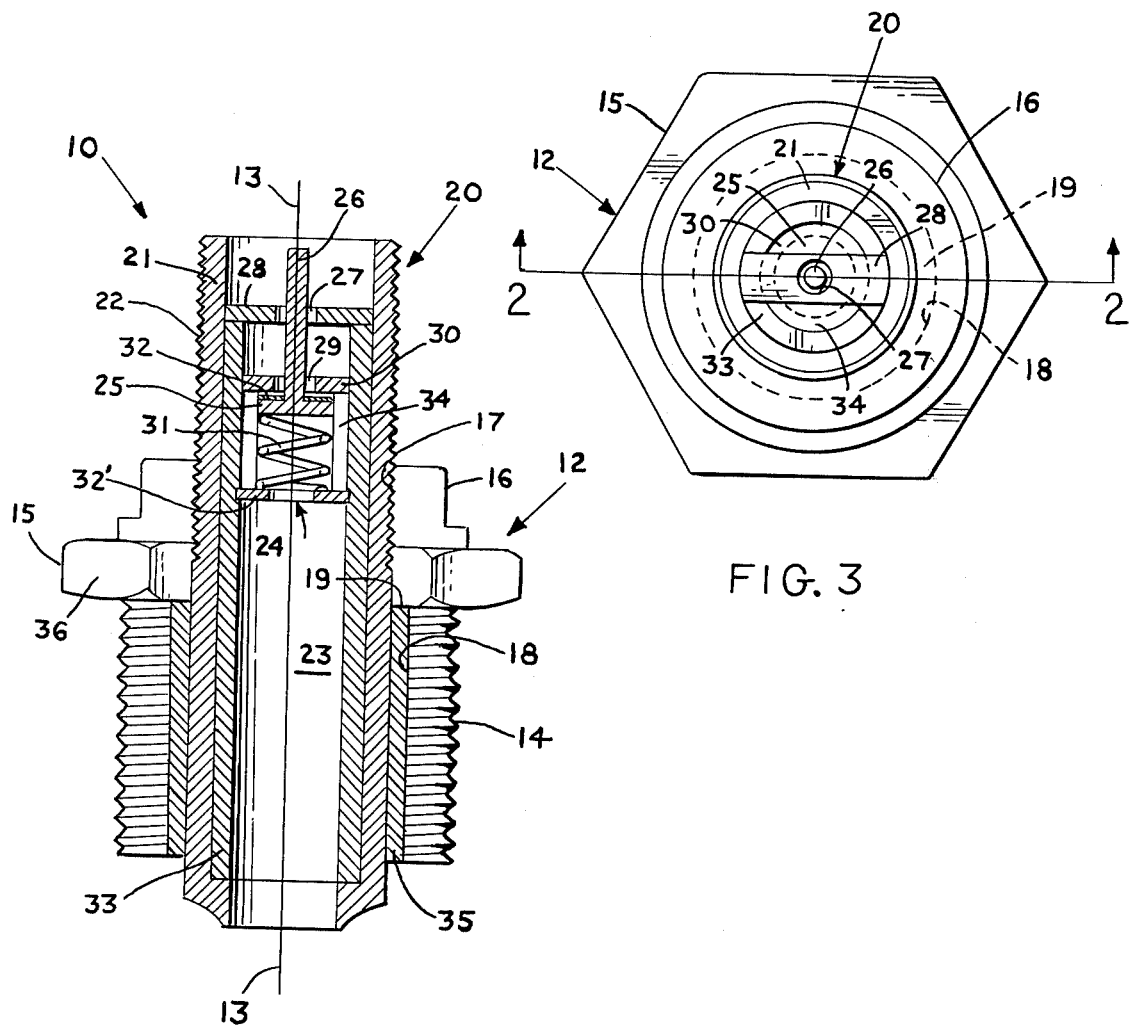
FIG. 2
FIG. 3

APPARATUS FOR REMOVING RESIDUAL WATER FROM A WATER SYSTEM

CROSS-RELATED APPLICATION

This application is a continuation-in-part of Ser. No. 886,244 filed Mar. 13, 1978 and now abandoned.

FIELD OF THE INVENTION

The invention relates to apparatus for removing residual water from a water system and in particular to a valve which can be detachably mounted in a water-supply pipe and includes an air valve element controlling flow of compressed air to the water supply pipe to blow out residual water therefrom.

BACKGROUND AND PRIOR ART

The removal of water from water-supply systems, particularly during winter months when sub-freezing temperatures may be encountered, is of great importance as standing water in a water supply system which is not used can freeze and rupture the pipes.

Even though great care may be taken to drain such water systems, frequently there are pockets of water remaining in fittings, elbows, and the like which cannot be easily reached and the trapped water can freeze and produce rupture of various parts.

It is known to blow compressed air through pipes in order to expel any water remaining therein.

U.S. Pat. No. 3,378,167 discloses apparatus for a self-service auto wash unit in which compressed air is blown through a water hose to remove any remaining water to avoid any possible freezing within the pipe.

U.S. Pat. No. 3,845,779 discloses and evacuating system for a garden hose in which compressed air can be introduced into the hose in order to discharge residual water therefrom.

In U.S. Pat. No. 3,378,167 a relatively complex system is employed in which an electrical timing system is utilized to selectively connect an air compresser to the hose to be evacuated.

In U.S. Pat. No. 3,845,779 an attachment is employed which fits between a water faucet and a water hose and selectively allows compressed air to be discharged through the hose to evacuate the same. The construction of the fitting, however, does not lend itself to use with metal water pipe systems.

SUMMARY OF THE INVENTION

An object of the invention is to provide a valve which can be detachably mounted in a water supply pipe and can control the supply of compressed air to the water supply pipe to blow out residual water from the pipe.

According to the invention, the valve comprises a hollow body having an axis of symmetry, threads on said body for threadably engaging said body with said pipe at a position therealong such that the body extends radially of said pipe and communication is established between the interior of the body and the interior of the pipe and tool engaging means integral with said body for allowing said body to be threadably engaged and disengaged with said pipe by a tool, said air valve element being coaxially secured in said hollow body to control flow of compressed air to said pipe, said air valve element extending axially from said body and including an actuating element to permit introduction of compressed air to said pipe via said hollow body.

In further accordance with the invention, a fitting is connected axially in the pipe and includes a removable threaded plug which is replaced by the valve when compressed air is to be introduced into the pipe.

It is further contemplated according to the invention that the tool engaging means extends radially from the body and forms a lower shoulder for bearing against the fitting when the valve is engaged therein.

In further accordance with the invention, the hollow body has upper and lower ends and the inner valve element projects from the upper end, said valve further comprising sealing means securing the air valve element in said hollow body and sealably closing the lower end of said body.

Further objects and features of the invention will follow from the description to be given in conjunction with a specific embodiment of the invention hereafter.

BRIEF DESCRIPTION OF THE DRAWINGS

FIG. 1 is a diagrammatic illustration of a water supply system showing the installation of the valve of the invention.

FIG. 2 is a cross-sectional view of the valve according to the invention as taken along line 2—2 in FIG. 3;

FIG. 3 is a top plan view of the valve in FIG. 2.

DETAILED DESCRIPTION

FIG. 1 of the drawing shows a water supply system 1 inclusive of an inlet pipe 2 connected to an elbow 3, in turn connected to a length of pipe 4 in which is installed a shut-off valve 5. A fitting 6 is connected in pipe 4 and pipe 4 extends beyond fitting 6 typically to a domestic water supply system. A drain valve 7 is shown at the end of the system. If the system is used to supply an outside connection, such as for a garden hose or the like, this will be typically connected to the drain valve at connection 8.

In order to expel residual water from the system, the invention contemplates the provision of a valve 10 which is threadably engaged in the fitting 6 after a plug 11 has been removed from the fitting 6.

In particular, fitting 6 is a T-fitting with removable plug 11 and installation of the valve 10 is accomplished by removing plug 11 and threadably engaging valve 10 into fitting 6.

The valve 10 comprises a hollow body 12 formed as a symmetrical member having an axis of symmetry 13—13. The body 12 includes a threaded portion 14 whose threads are adapted for engaging in a corresponding threaded portion in the T-fitting 6. At the upper end of threaded portion 14, the body 12 includes a hexagonally shaped tool-engaging portion 15 which extends radially beyond the threaded portion 14. The tool-engaging portion 15 is adapted for being engaged by a wrench to allow the threaded portion 14 to be selectively engaged and disengaged with the T-fitting 6. An upper crown portion 16 extends axially from the tool-engaging portion 15 thereabove.

The valve body 12 has a through bore formed by a first bore 17 which opens into a second bore 18 of greater diameter so as to form a shoulder 19 between bores 17 and 18.

An air valve 20 extends coaxially within body 12 and projects from the upper and lower ends thereof.

The air valve 20 is a conventional structure which is used to control the admission of compressed air as typically employed for a conventional tire.

The air valve 20 includes a casing 21 which is threaded at 22 through the upper portion of its length. The air valve 20 has a central bore 23 which communicates with the interior of the T-fitting 6 when the valve 10 is installed in the fitting. A valve assembly 24 selectively controls the passage of compressed air through the air valve 20 into the fitting 6 and thereby into the pipe 4.

The valve assembly 24 comprises a piston 25 whose stem 26 extends upwardly through a hole 27 in a narrow plate 28 secured in the casing 21. The stem passes through a hole 29 in a plate 30 and the piston 25 at the lower end of stem 26 is urged by spring 31 to an upwards position where a gasket 32 on the piston will seal the hole 29 and place the valve in closed condition. The spring 31 bears against a counter plate 32' affixed to the interior of a sleeve 33 fixed in casing 21. The plates 28 and 30 are also affixed to the sleeve 33. Ribs 34 are circumferentially spaced along the inner surface of sleeve 33 and guide the piston 25 in its vertical movement.

When the stem 26 is displaced downwardly, compressed air can pass through the valve 20 into the interior of T-fitting 6.

It is a feature of the invention that there is an axial assembly of the body 12 with the air valve 20 and that there is a coaxial relationship between the threaded portion 14 and the axis of the air valve 20. This enables the resulting valve 10 to be simply threadably engaged in fitting 6 in exactly the same manner as the plug 11, thus greatly simplifying the installation and removal of the air valve in its course of use. Stated otherwise, both the plug 11 and the valve 10 are installed in the fitting 6 in identical fashion greatly facilitating the removal of one and the installation of the other.

In further accordance with the invention, a space is formed between the inner surface of the bore 18 and the outer surface of the casing 21 and a sealing material 35 is introduced into this space to secure the casing to the body and to form a seal therebetween. The sealing means 35 may be an adhesive, such as an epoxy, or it may be constituted of weld material. Although the valve element 20 is generally press fit within the bore 17, the addition of the sealing means 35 greatly strengthens the assembly and, also, insures a sealed relation between the elements to prevent any escape of compressed air in the course of its introduction into T-fitting 6 so that pressure can be developed within pipe 4 to expel residual water therein.

In operation, in order to remove residual water from pipe 4, the shut-off valve 5 is first closed and the drain valve 7 is opened. The plug 11 is removed from T-fitting 6 and replaced by valve 10. The installation of the valve in the T-fitting is achieved by threading portion 14 of the body 12 into the T-fitting and tightening the valve until the shoulder 36 at the bottom of the tool-engaging portion 15 abuts against the upper surface of fitting 6. Then a nozzle of an air compressor is placed on the air valve 20 so as to depress the stem 26 which will allow the compressed air to flow through the bore 23 into the T-fitting 6 and thence into the pipe 4 to expel any residual water in the pipe through the outlet fitting 8. If a hose is connected to the outlet fitting it too will be freed from residual water.

It is particularly noteworthy that the force applied on the actuator 26 to open the air valve 20 and allow compressed air to enter the water supply system is resisted by the threaded engagement of portion 14 with fitting 6 and the abutment of shoulder 36 on tool engaging portion 15 with the top of the fitting. This rigid support of the valve in an axial direction is effected to prevent any bending displacement at any of the threaded connections. Hence reliable sealing at the time of introduction of compressed air is achieved and, additionally, the valve can be repeatedly used without any danger of breakage or long term fatigue failure.

Although the invention has been disclosed in conjunction with a preferred embodiment thereof, numerous modifications and variations will become evident to those skilled in the art without departing from the scope and spirit of the invention as defined by the appended claims.

What is claimed is:

1. Apparatus for removing residual water from a water system including a water-supply pipe, a fitting in said pipe, and a shut-off valve in said pipe, said apparatus comprising a valve detachably mounted in said fitting in the water-supply pipe and including an air valve element controlling flow of supplied compressed air to said water-supply pipe to blow out residual water from said pipe after the shut-off valve has been closed, said valve comprising a hollow body having an axis of symmetry, threads on said body for threadably engaging said body with said pipe at a position therealong such that the body extends radially of said pipe and communication is established between the interior of the body and the interior of the pipe and tool engaging means integral with said body for allowing said body to be threadably engaged and disengaged with said pipe by a tool, said air valve element being coaxially secured in said hollow body to control flow of compressed air to said pipe, said air valve element extending axially from said body and including an actuating element to permit introduction of compressed air to said pipe via said hollow body, said tool engaging means extending radially from said body and forming a lower shoulder for bearing against said fitting, said hollow body having upper and lower ends, said air valve element projecting from said upper end, said hollow body having a bore with a first portion in which said air valve element is press-fit and a second portion of larger diameter surrounding said air valve element in annular spaced relation, said first and second portions forming a shoulder therebetween, and sealing means filling the space between said air valve element and said hollow body between said shoulder and the lower end of said hollow body for securing said air valve element in said hollow body and sealably closing said lower end of said body.

2. Apparatus as claimed in claim 1 wherein said fitting is connected axially in said pipe and further comprising a removable threaded plug in said fitting, said body being threadably engageable in said fitting with said plug removed.

3. Apparatus as claimed in claim 1 wherein said fitting is a T-fitting.

4. Apparatus as claimed in claim 1 wherein said sealing means comprises an adhesive means.

5. Apparatus as claimed in claim 1 wherein said sealing means comprises a weld.

6. Apparatus as claimed in claim 1 wherein said annular space extends in said body along the length of the threads thereof which engage the pipe and up to said shoulder on the tool engaging means.

* * * * *